(12) United States Patent
Choi et al.

(10) Patent No.: US 10,336,391 B1
(45) Date of Patent: Jul. 2, 2019

(54) STEERING SYSTEM OF SMALL MOBILITY

(71) Applicants: Hyundai Motor Company, Seoul (KR); Kia Motors Corporation, Seoul (KR)

(72) Inventors: Jungnam Choi, Gyeonggi-do (KR); Sung Dae Lim, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 16/176,908

(22) Filed: Oct. 31, 2018

(30) Foreign Application Priority Data

May 17, 2018 (KR) .................. 10-2018-0056520

(51) Int. Cl.
*B62K 5/025* (2013.01)
*A63B 22/20* (2006.01)
*B62D 7/20* (2006.01)
*B62K 5/08* (2006.01)

(52) U.S. Cl.
CPC ............ *B62K 5/025* (2013.01); *A63B 22/203* (2013.01); *B62D 7/20* (2013.01); *B62K 5/08* (2013.01)

(58) Field of Classification Search
CPC ............ B62D 7/20; B62K 5/00; A63B 22/203
See application file for complete search history.

(56) References Cited

U.S. PATENT DOCUMENTS

| | | | |
|---|---|---|---|
| 8,708,354 B2 * | 4/2014 | Young | A63C 17/0033 280/87.042 |
| 9,283,848 B2 * | 3/2016 | Parienti | B62K 3/002 |
| 2017/0007900 A1 * | 1/2017 | Slagter | A63B 69/18 |

* cited by examiner

*Primary Examiner* — James A Shriver, II
*Assistant Examiner* — James J Triggs
(74) *Attorney, Agent, or Firm* — Mintz Levin Cohn Ferris Glovsky and Popeo, P.C.; Peter F. Corless

(57) ABSTRACT

A steering apparatus of a small mobility is provided. The steering apparatus is applied to one of a front wheel portion and a rear wheel portion connected to a body thereof. The apparatus includes a main link member that is connected to the body through a plurality of main link arms to move left and right casters in the forward and backward directions due to link movement of the main link arms when the body center of gravity is moved to the left and right directions. A sub link member is connected to the caster through a hub shaft when connected to the main link member through a plurality of sub link arms and changes a steering angle of the left and right casters moved by the main link member through link movement of the respective sub link arm.

12 Claims, 6 Drawing Sheets

STEERING SYSTEM OF SMALL MOBILITY

CROSS-REFERENCE TO RELATED APPLICATION

This application claims priority to and the benefit of Korean Patent Application No. 10-2018-0056520 filed on May 17, 2018, the entire contents of which are incorporated herein by reference.

BACKGROUND

(a) Field of the Invention

The present invention relates to a steering system of small mobility, and more particularly, to a steering system of small mobility that improves driving stability by controlling centrifugal force due to rotation using the difference in position of the caster due to the movement of the center of gravity of the occupant when turning.

(b) Description of the Related Art

Generally, a personal mobility device is a fusion of electric charging and power technology. Such mobility is also referred to as Smart Mobility or Micro Mobility. Electric mobility, electric quick board, electric bicycle is a typical small mobility. An advantage of this small mobility is that it is an environmentally friendly transport since the power is electricity or a motor. The small mobility generally includes front and rear wheels at a front and rear part respectively, a footrest between the front and rear wheels, and a steering wheel connected to the front wheels to steer the front wheels.

However, since the conventional small mobility described above is reflected in the absence of the caster angle or in a very small area, the center of gravity is directed forward even in a small obstacle, which causes a conduction defect. In addition, the small mobility is steered only by the steering wheel. When the steering wheel is rapidly rotated in an accelerated state, a centrifugal force is generated and the user loses its center or may be seriously injured.

The above information disclosed in this section is merely for enhancement of understanding of the background of the invention and therefore it may contain information that does not form the prior art that is already known in this country to a person of ordinary skill in the art.

SUMMARY

The present invention provides a small mobility steering apparatus which is structured to be able to steer due to a difference in position of a caster caused by a movement of a center of gravity of a user and provides a more stable boarding environment.

The exemplary embodiment of the present invention is applied to one of a front wheel portion and a rear wheel portion connected to a body of small mobility and may include a main link member connected to the body through a plurality of main link arms to move left and right casters in the forward and backward directions due to link movement of the main link arms when the body center of gravity is moved to the left and right directions, and a sub link member connected to the caster through a hub shaft when connected to the main link member through a plurality of sub link arms and changing a steering angle of the left and right casters moved by the main link member through link movement of the respective sub link arm.

In addition, the main link member may include a first and second main link arms connected to the body respectively, and a third main link arm that connects the first and second main link arms to be formed as a multi-link having a first to a fourth joint. The sub link member may include a first sub link arm connected to an arbitrary position on the first main link arm, a second sub link arm connected to an arbitrary position on one of the second main link arm or the third main link arm to be formed as a multi-link having a fifth to a seventh joint.

The exemplary embodiment of the present invention may include two casters of left and right sides on one of a front wheel portion and a rear wheel portion connected to a body of small mobility, and may include a four bar link member having a first main link arm and a second main link arm connected to the body, respectively to have a first and second joints and a third main link arm connected between the first and second main link arms to have a third and fourth joints, and a three bar link member having a first sub link arm connected to an arbitrary position to have a fifth joint and a second sub link arm connected to one of the second main link arm or the third main link arm when connected to the first sub link arm to have a sixth and seventh joints, and connecting one of the first sub link arm and the second sub link arm to a caster.

The caster may be connected to one of the first sub link arm and the second sub link arm through a hub shaft based on a seventh joint between the first sub link arm and the second sub link arm. When traveling straight, a reference distance between the respective fifth joint and the sixth joint connected to casters on both sides may be maintained to be constant.

In addition, when turning right, the four bar link member connected to a right side caster may be compressed to decrease a distance between the fifth joint and the sixth joint connected to the right side caster to be shorter than the reference distance. Therefore, the right side caster moves in a front direction and the right side caster rotates in a right direction by the three bar link member, and the four bar link member connected to a left side caster may extend to increase a distance between the fifth joint and the sixth joint connected to the left side caster to be greater than the reference distance. Therefore, the left side caster moves in a rear direction and the left side caster rotates in a right direction by the three bar link member.

When turning left, the four bar link member connected to a left side caster may be compressed to decrease a distance between the fifth joint and the sixth joint connected to the left side caster to be shorter than the reference distance. Therefore, the left side caster moves in a front direction and the left side caster rotates in a left direction by the three bar link member, and the four bar link member connected to a right side caster may extend to increase a distance between the fifth joint and the sixth joint connected to the right side caster to greater than the reference distance. Therefore, the right side caster moves in a rear direction and the right side caster rotates in a left direction by the three bar link member. The four bar link member may be mounted on the body in a shape of a parallelogram from a top or side view. In addition, a suspension may be mounted on one of the first and second main link arms.

An exemplary embodiment of the present invention is structured to be able to steer due to a difference in position of a caster due to movement of a center of gravity of a user and provides a more stable boarding environment. Further, the effects which may be obtained or predicted by the exemplary embodiment of the present invention will be directly or implicitly disclosed in the detailed description of the exemplary embodiments of the present invention. In other words, various effects which are predicted by the exemplary embodiments of the present invention will be disclosed in the detailed description to be described below.

BRIEF DESCRIPTION OF THE DRAWINGS

The objects, features and advantages of the present invention will be more apparent from the following detailed description in conjunction with the accompanying drawings, in which.

DESCRIPTION OF SYMBOLS

Figure 1:
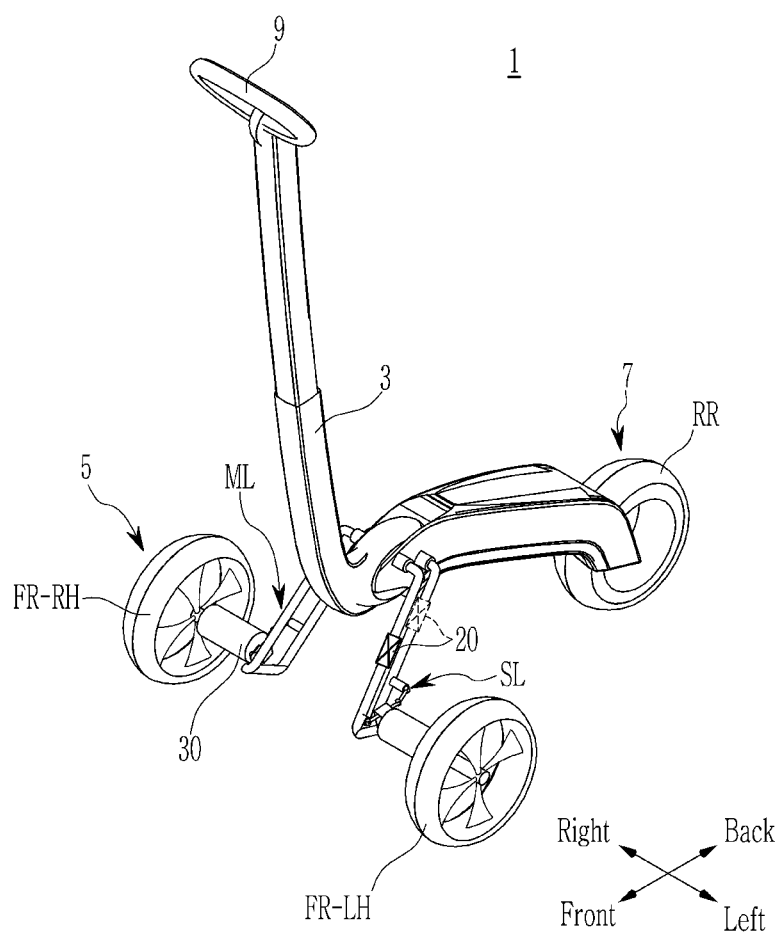
FIG. 1 is a diagram showing a straight-ahead state of a small mobility equipped with a small mobility steering system according to an exemplary embodiment of the present invention.

1: small mobility
3: body
5: front wheel portion
7: rear wheel portion
9: handle
FR-RH, FR-LH: caster
ML1-ML3: a first to third main link arm
SL1-SL2: a first to second sub link arm
J1-J7: a first to seventh joint
20: suspension
30: hub shaft

DETAILED DESCRIPTION

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

The present invention will be described more fully hereinafter with reference to the accompanying drawings, in which exemplary embodiments of the invention are shown. As those skilled in the art would realize, the described exemplary embodiments may be modified in various different ways, all without departing from the spirit or scope of the present invention. Accordingly, the drawings and description are to be regarded as illustrative in nature and not restrictive. Like reference numerals designate like elements throughout the specification. Names of elements in the following description are distinguished into first, second, and the like to distinguish the elements because the names of the elements are the same and are not particularly limited to an order thereof.

In a steering system of small mobility according to an exemplary embodiment of the present invention (hereinafter, referred to as a steering system), the small mobility to which the steering system is applied may include a front wheel portion and a rear wheel portion, and two casters on one of the front wheel portion or the rear wheel portion. In other words, the steering system according to an exemplary embodiment of the present invention may be applied to a mobility having at least three casters.

In addition, the steering system according to an exemplary embodiment of the present invention is illustrated as being applied to the front wheel portion, however, it is not limited thereto, the steering system may be applied to the rear wheel portion as necessary. The steering system according to an exemplary embodiment of the present invention may also be applied to the front wheel portion and the rear wheel portion simultaneously.

Figure 2:
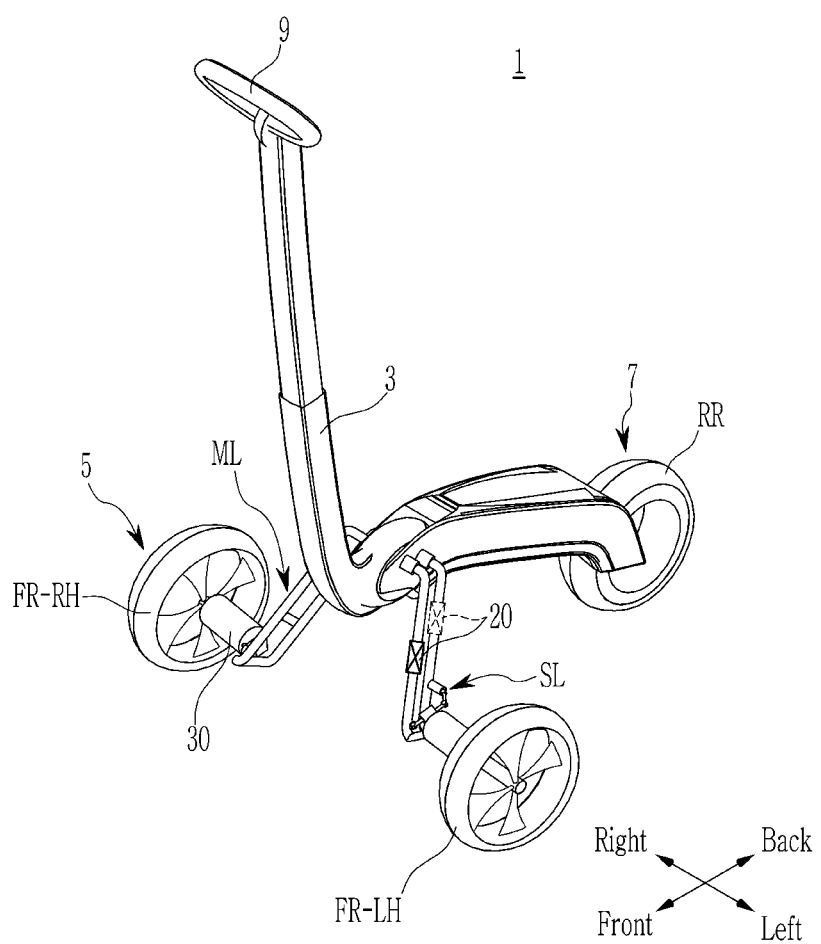
FIG. 2 is a diagram showing a turning-right state of a small mobility equipped with a small mobility steering system according to an exemplary embodiment of the present invention.
Figure 3:
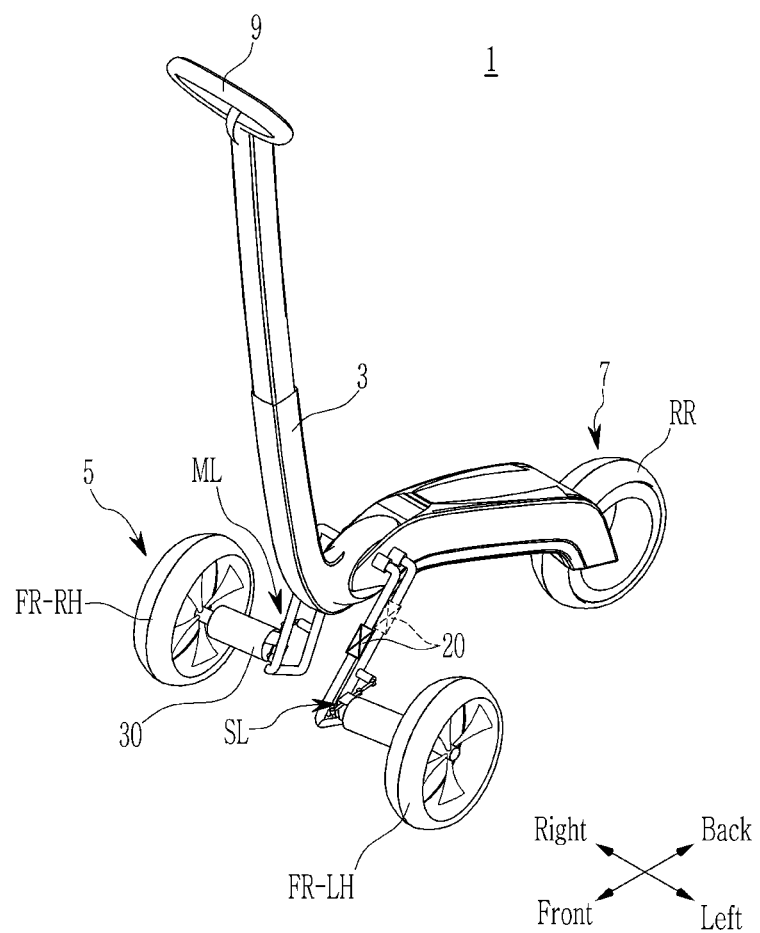
FIG. 3 is a diagram showing a turning-left state of a small mobility equipped with a small mobility steering system according to an exemplary embodiment of the present invention.

FIG. 1 is a diagram showing a straight-ahead state of a small mobility equipped with a small mobility steering system according to an exemplary embodiment of the present invention, FIG. 2 is a diagram showing a turning-right state of a small mobility equipped with a small mobility steering system according to an exemplary embodiment of the present invention, and FIG. 3 is a diagram showing a turning-left state of a small mobility equipped with a small mobility steering system according to an exemplary embodiment of the present invention.

Referring to FIG. 1, the small mobility 1 to which the steering system according to an exemplary embodiment of the present invention is applied may include two wheel casters FR-RH and FR-LH connected to the body 3 on the front wheel portion 5, and one caster RR connected to the body 3 on the rear wheel portion 7.

In addition, the small mobility 1 may include a handle 9 on an upper end portion of the body 3. The small mobility 1 may include a footrest (not shown) for mounting a user's foot or feet on the body 3 and may be provided integrally or separately. The footrest may be changed as necessary. The steering system may be mounted between two casters FR-RH and FR-LH on the front wheel portion 5 of the small mobility 1 and the body 3, respectively. When traveling substantially straight, both side casters FR-RH and FR-LH of the steering system are parallel to a progress direction on a same position.

Referring to FIG. 2, when turning right, center of gravity of the body 3 is moved to right side direction and steered to the right side direction, therefore the right side caster FR-RH moved to a front direction and at the same time, rotates automatically to the right side direction. At this time, the left side caster FR-LH moves to a rear direction, and rotates automatically to the right side direction same to the right side caster FR-RH.

Referring to FIG. 3, when turning left, center of gravity of the body 3 is moved to left side direction and steered to the left side direction, therefore the left side caster FR-LH moved to a front direction and at the same time, rotates automatically to the left side direction. At this time, the right side caster FR-RH moves to a rear direction, and rotates automatically to the left side direction same to the left side caster FR-LH. The steering system may further include a main link member ML and a sub link member SL, and this will be described in detail as follows.

Figure 4:
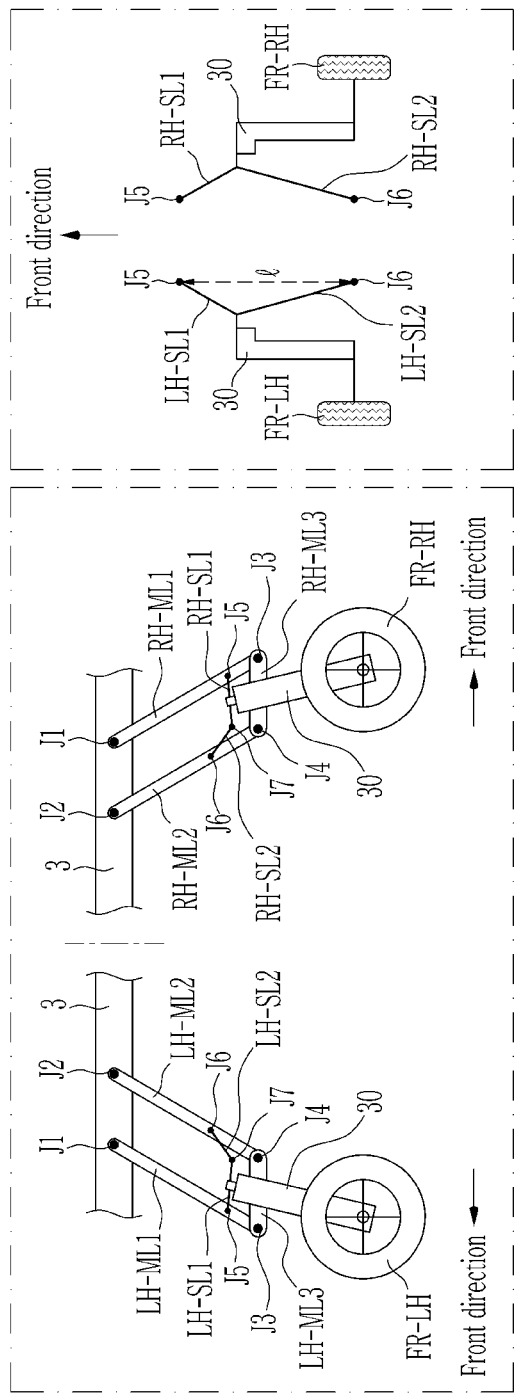
FIG. 4 is a schematic diagram schematically showing a straight-ahead state of a steering system of a small mobility according to an exemplary embodiment of the present invention.
Figure 5:
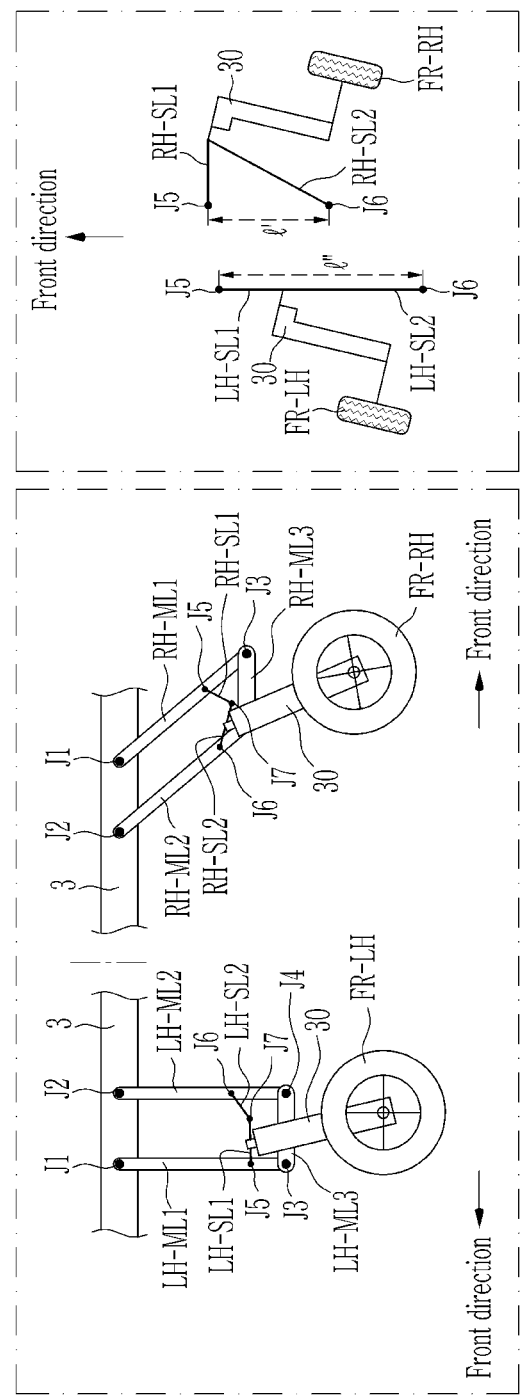
FIG. 5 is a schematic diagram schematically showing a turning-right state of a steering system of a small mobility according to an exemplary embodiment of the present invention.
Figure 6:
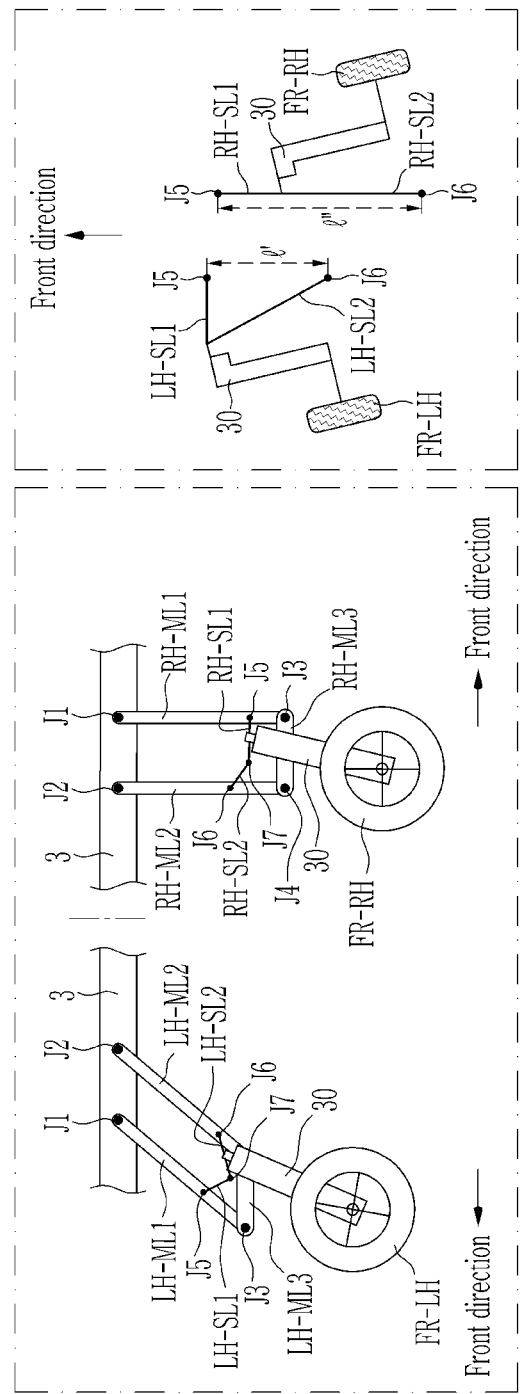
FIG. 6 is a schematic diagram schematically showing a turning-left state of a steering system of a small mobility according to an exemplary embodiment of the present invention.

FIG. 4 is a schematic diagram schematically showing a straight-ahead state of a steering system of a small mobility according to an exemplary embodiment of the present invention, FIG. 5 is a schematic diagram schematically showing a turning-right state of a steering system of a small mobility according to an exemplary embodiment of the present invention, and FIG. 6 is a schematic diagram schematically showing a turning-left state of a steering system of a small mobility according to an exemplary embodiment of the present invention.

Referring to FIG. 4, the main link member ML and the sub link member SL may be respectively mounted to the both side casters FR-RH and FR-LH separately. In particular, the steering system may be applied to one of the right and left casters irrespective of the directions of the both side casters FR-RH and FR-LH. The steering system may be configured to move both side casters FR-RH and FR-LH forward or backward with a potential difference when the center of gravity of the body moves left and right due to the link movement of the main link member ML composed of the body 3 and the plurality of main link arms.

Further, the main link member ML may be a multi-link having a first to third link arms ML1 to ML3 and four bar link members having a first to fourth joints. More specifically, the main link member ML may include a first main link arm ML1 connected to one side of the body 3, and a second main link arm ML2 connected to the other side of the body 3 to be mounted adjacently to the first main link arm ML1. At this time, the main link member ML may have a first joint J1 formed between the first main link arm ML1 and the body 3 and a second joint J2 formed between the second main link arm ML2 and the body 3.

In addition, the main link member ML may include a third main link arm ML3 that connects the first main link arm ML1 and the second main link arm ML2 at an opposite side of the body 3. The main link member ML may also include a third joint J3 formed between the first main link arm ML1 and the third main link arm ML3 and a fourth joint J4 formed between the second main link arm ML2 and the third main link arm ML3.

The main link member ML may be mounted on the body 3 in a shape of a parallelogram from a top or side view. In addition, a suspension 20 may be mounted on the main link member ML. In other words, the suspension 20 may be mounted on one of the first main link arm ML1 and the second main link arm ML2. The suspension 20 is commonly used, and thus, a detailed description thereof will be omitted. The steering system may be connected to the casters FR-RH and FR-LH through the hub shaft 30 when connected to the main link member ML through a sub link member SL having a plurality of sub link arms.

The sub link member SL may be configured to vary the steering angles of the left and right caster FR-RH and FR-LH moved by the main link member ML through the link motion of each sub link arm. In particular, the sub link member SL may be a three bar link member having fifth to seventh joints J5 to J7 including the first and second sub link arms SL1 and SL2. In other words, the sub link member SL may include a first sub link arm SL1 connected to an arbitrary position on the first main link arm ML1. The sub link member SL may be formed with a fifth joint J5 between the first main link arm ML1 and the first sub link arm SL1.

In addition, the sub link member SL may include a second sub link arm SL2 connected to an arbitrary position on the second main link arm ML2. Particularly, the second sub link arm SL2 may be connected to any arbitrary position on the third main link arm ML3. In other words, the second sub link arm SL2 may be connected to at least one of the second main link arm ML2 and the third main link arm ML3, and may be connected to the first sub link arm SL1.

The sub link member SL may be formed with a sixth joint J6 between the second sub link arm SL2 and the second main link arm ML2 or the third main link arm ML3. In addition, the seventh joint J7 may be formed between the first sub link arm SL1 and the second sub link arm SL2 of the sub link member SL. The casters FR-RH and FR-LH may be connected to the sub link member SL, and may be connected to one of the first sub link arm SL1 and the second sub link arm SL2 based on the seventh joint J7 through the hub shaft 30. In other words, the casters FR-RH and FR-LH may be mounted to any one of the fifth joint J5 or the sixth joint J6 based on the seventh joint J7.

When traveling substantially straight, reference distance between the respective fifth joint J5 and the sixth joint J6 connected to casters FR-RH and FR-LH on both sides may be maintained to be constant. In other words, the distance between the first main link arm ML1 and the second main link arm ML2 may be maintained at a particular distance from the body 3 to the sub link member SL, and the casters FR-RH and FR-LH connected to the sub link member SL may be configured to be parallel to the traveling direction.

Referring to FIG. 5, when turning right, the steering apparatus may be steered to the right side and thus, the distance between the first main link arm RH-ML1 and the second main link arm RH-ML2 of the right caster FR-RH may decrease. As the distance between the first sub link arm RH-SL1 of the right caster FR-RH and the second sub link arm RH_SL2 decreases, the distance I' between the fifth joint RH-J5 and the sixth joint RH-J6 becomes shorter than the reference distance 1.

Similarly, when turning right, the distance between the first main link arm LH-ML1 and the second main link arm LH-ML2 of the left caster FR-LH increases. As the distance between the first sub-link arm LH-SL1 and the second sub-link arm LH-SL2 of the left caster FR-LH increases, the distance I" between the fifth joint LH-J5 and the sixth joint LH-J6 becomes greater than the reference distance 1. The casters FR-RH and FR-LH on both sides may be automatically turned to the right side by the linking motion of the sub link member SL to perform steering.

Referring to FIG. 6, when turning left, the steering apparatus may be steered to the left side and thus, the distance between the first main link arm LH-ML1 and the second main link arm LH-ML2 of the left caster FR-LH may decrease. As the distance between the first sub link arm RH-SL1 of the left caster FR-LH and the second sub link arm RH_SL2 decreases, the distance I' between the fifth joint RH-J5 and the sixth joint RH-J6 becomes shorter than the reference distance 1. Similarly, when turning left, the distance between the first main link arm LH-ML1 and the second main link arm LH-ML2 of the right caster FR-RH may increase. As the distance between the first sub-link arm LH-SL1 and the second sub-link arm LH-SL2 of the right caster FR-RH increases, the distance I" between the fifth joint LH-J5 and the sixth joint LH-J6 becomes greater than the reference distance 1. The casters FR-RH and FR-LH on both sides may be automatically turned to the left side by the linking motion of the sub link member SL to perform steering.

Therefore, the steering apparatus of small mobility according to the exemplary embodiment of the present invention may simultaneously perform steering by tilting by applying a main link member ML having a four bar link and a sub link member SL having a three bar link. In other words, the steering apparatus of small mobility may control the centrifugal force by the rotation caused by the position difference of the casters FR-RH and FR-LH according to the movement of the center of gravity of the user, thus, may provide a ride environment that is easier to operate and is more stable.

In addition, the steering apparatus of small mobility according to the exemplary embodiment of the present invention may absorb the direct impact by incorporating the suspension 20, if necessary. The suspension 20 has an advantage of being able to increase the stroke distance unlike the short-length suspension applied to the steering apparatus of small mobility according to the exemplary embodiment of the present invention is also capable of producing uniform products irrespective of thermal deformation due to welding at the time of manufacturing the body 3 by link assembly.

While this invention has been described in connection with what is presently considered to be exemplary embodiments, it is to be understood that the invention is not limited to the disclosed exemplary embodiments, but, on the contrary, is intended to cover various modifications and equivalent arrangements included within the spirit and scope of the appended claims.

What is claimed is:

1. A steering system of a small mobility, applied to one of a front wheel portion and a rear wheel portion connected to a body of the small mobility, comprising:
    a main link member connected to the body through a plurality of main link arms to move left and right casters in the forward and backward directions due to link movement of the main link arms when the body center of gravity is moved to the left and right directions; and
    a sub link member connected to the caster through a hub shaft when connected to the main link member through a plurality of sub link arms and configured to change a steering angle of the left and right casters moved by the main link member through link movement of the respective sub link arm.

2. The steering system of claim 1, wherein the main link member includes:
    a first and second main link arms connected to the body respectively; and
    a third main link arm that connects the first and second main link arms to be formed as a multi-link having a first to a fourth joint.

3. The steering system of claim 2, wherein the sub link member includes:
    a first sub link arm connected to an arbitrary position on the first main link arm; and
    a second sub link arm connected to an arbitrary position on one of the second main link arm or the third main link arm to be formed as a multi-link having a fifth to a seventh joint.

4. A steering system of a small mobility, having two casters of left and right sides on one of a front wheel portion and a rear wheel portion connected to a body of the small mobility, comprising:
    a four bar link member having a first and second main link arms connected to the body respectively to have a first and second joints and a third main link arm connected between the first and second main link arms to have a third and fourth joints; and
    a three bar link member having a first sub link arm connected to an arbitrary position to have a fifth joint and a second sub link arm connected to one of the second main link arm or the third main link arm when connected to the first sub link arm to have a sixth and seventh joints, and connecting one of the first sub link arm and the second sub link arm to a caster.

5. The steering system of claim 4, wherein the caster is connected to one of the first sub link arm and the second sub link arm through a hub shaft based on a seventh joint between the first sub link arm and the second sub link arm.

6. The steering system of claim 4, wherein when traveling straight, a reference distance between the respective fifth joint and the sixth joint connected to casters on both sides is maintained to be constant.

7. The steering system of claim 6, wherein when turning right, the four bar link member connected to a right side caster compresses to decrease a distance between the fifth joint and the sixth joint connected to the right side caster to less than the reference distance and to move the right side caster in a front direction and cause the right side caster to rotate in a right direction by the three bar link member.

8. The steering system of claim 7, wherein when turning right the four bar link member connected to a left side caster expands to increase a distance between the fifth joint and the sixth joint connected to the left side caster to be greater than the reference distance to cause the left side caster to move in a rear direction and the left side caster to rotate in a right direction by the three bar link member.

9. The steering system of claim 7, wherein when turning left, the four bar link member connected to a left side caster compresses to decrease a distance between the fifth joint and the sixth joint connected to the left side caster to be less than the reference distance and to move the left side caster in a front direction and cause the left side caster to rotate in a left direction by the three bar link member.

10. The steering system of claim 9, wherein when turning left the four bar link member connected to a right side caster expands to increase a distance between the fifth joint and the sixth joint connected to the right side caster to be greater than the reference distance to cause the right side caster to move in a rear direction and the right side caster to rotate in a left direction by the three bar link member.

11. The steering system of claim 4, wherein the four bar link member is mounted on the body in a shape of a parallelogram from a top or side view.

12. The steering system of claim 4, wherein a suspension is mounted on one of the first and second main link arms.

* * * * *